United States Patent
Akiyoshi

(10) Patent No.: US 7,324,858 B2
(45) Date of Patent: Jan. 29, 2008

(54) REPLAY APPARATUS, REPLAY METHOD, RECORDING MEDIUM, AND COMPUTER PROGRAM

(75) Inventor: Kunihiko Akiyoshi, Saitama (JP)

(73) Assignee: Sony Corporation (JP)

( * ) Notice: Subject to any disclaimer, the term of this patent is extended or adjusted under 35 U.S.C. 154(b) by 788 days.

(21) Appl. No.: 10/848,283

(22) Filed: May 18, 2004

(65) Prior Publication Data

US 2005/0015570 A1   Jan. 20, 2005

(30) Foreign Application Priority Data

May 19, 2003   (JP)   ............................ P2003-140569

(51) Int. Cl.
*G06F 17/00*   (2006.01)
(52) U.S. Cl. .......................................... 700/94; 386/68
(58) Field of Classification Search ................... 700/94
See application file for complete search history.

(56) References Cited

U.S. PATENT DOCUMENTS 7,107,111 B2 *   9/2006   Van De Kerkhof et al. .. 700/94
2004/0249489 A1 *   12/2004   Dick ........................... 700/94

* cited by examiner

*Primary Examiner*—Sinh Tran
*Assistant Examiner*—Walter F Briney, III
(74) *Attorney, Agent, or Firm*—Lerner, David, Littenberg, Krumholz & Mentlik, LLP

(57) ABSTRACT

A replay apparatus calculates an exact play time even during a fast-forward replay operation and a rewind and replay operation. A demultiplexer demultiplexes an input stream into an audio elementary stream, and stores ES data of the audio elementary stream in a data buffer on a frame by frame basis. The demultiplexer calculates the number of main data frames contained in a first frame to each of the frames on a frame by frame basis, and stores the number of main data frames in an ES data information buffer. A decoder calculates a total play time based on the number of main data frames from the ES data information buffer. The invention is applicable to audio and visual apparatuses.

5 Claims, 11 Drawing Sheets

FIG. 9

```
for (cnt=1;cnt≦N:cnt++){
    if (MainDataFrameAdr(N) >= TotalFrameSize(cnt-1)) &&
        (MainDataFrameAdr(N) < TotalFrameSize(cnt))){
        X = cnt;
        break;
    }
}
```

REPLAY APPARATUS, REPLAY METHOD, RECORDING MEDIUM, AND COMPUTER PROGRAM

CROSS-REFERENCE TO RELATED APPLICATIONS

The present application claims priority from Japanese Application No. 2003-140569 filed May 19, 2003, the disclosure of which is hereby incorporated by reference herein.

BACKGROUND OF THE INVENTION

The present invention relates to a replay apparatus, a replay method, a recording medium, and a computer program and, in particular, to a replay apparatus, a replay method, a recording medium, a computer program for precisely determining total play time when music is fast forward replayed or rewound for replaying.

FIG. 1 illustrates the structure of a known replay apparatus 1 that replays music. The replay apparatus 1 includes a demultiplexer 11, an elementary stream (ES) data buffer 12, and a decoder 13.

The replay apparatus 1 receives an input stream, into which audio elementary streams, obtained by encoding pulse code modulated music data, are multiplexed. The input stream is supplied to the demultiplexer 11.

The demultiplexer 11 separates the audio elementary stream from the input stream, and stores the audio elementary stream in the ES data buffer 12. The decoder 13 decodes the audio elementary stream stored in the ES data buffer 12 on a per audio access unit basis, and outputs (replays) the resulting pulse code modulation (PCM) data on a per audio access unit basis.

FIG. 2 illustrates the structure of an audio elementary stream formed of fixed-length encoded data. The audio elementary stream containing fixed-length encoded data includes a plurality of fixed-length frames. Each frame includes a header section and a data section.

The header section is formed of a frame header. The frame header has information representing each frame, and starts with a synchronization bit. Written in the frame header are a sampling frequency and a bit rate used to encode the data of the data section, and information as to the presence or absence of a padding representing data used to align a frame size with a byte unit.

The data section is formed of a main data frame that represents data of one audio access unit that is obtained by fixed-length coding PCM data having a fixed length (a fixed number of samples) on a frame by frame basis.

Since the encoded PCM data has a fixed length in the audio elementary stream containing the fixed-length coded data shown in FIG. 2, the data section of each fixed-length frame is constructed of the main data frame only in that frame. In an audio elementary stream having fixed-length coded data, the number of main data frames from the first frame to the start position of each subsequent frame equals the number of frames from the first frame to the start position of each subsequent frame.

The currently widely used motion picture experts group (MPEG) 1 layer 3 (MP3) employs a variable-length coding method (see non-patent document ISO/IEC 11172-3 International Standard MPEG-1 Audio (1993)). FIG. 3 illustrates the structure of an audio elementary stream constructed of variable-length coded data. The audio elementary stream constructed of variable-length coded data has a plurality of fixed-length frames. Each frame includes a header section, a side information section, and a data section.

The header section contains a frame header. The frame header, having a constant duration of time, starts with a synchronization bit. Written in the frame header are a sampling frequency and a bit rate used to encode the data of the data section, and information as to the presence or absence of a padding representing data used to convert a frame size into units of bytes.

Written in the side section information is a start position of a main data frame of each frame.

Each data section contains a main data frame representing data that is obtained by variable-length coding one audio access unit PCM data having a fixed length (i.e., having a predetermined number of samples) with respect to each frame. For example, the data that is obtained by variable-length coding the PCM data having a fixed length in connection with a frame #1 is a main data frame #1. The data that is obtained by variable-length coding the PCM data having a fixed length in connection with a frame #2 is a main data frame #2. The data that is obtained by variable-length coding the PCM data having a fixed length in connection with a frame #3 is a main data frame #3.

Since the main data frame in the audio elementary stream containing variable-length coded data is variable in length as shown in FIG. 3, the size of the data section is different from the size of the main data frame. The data section of the frame is not necessarily formed of the main data frame only. As shown in FIG. 3, for example, the data section of the frame #1 contains the main data frame #1 for the frame #1, the main data frame #2 for the frame #2, and a portion of the main data frame #3 for the frame #3.

In an audio elementary stream formed of variable-length coded data, the number of frames from the first frame to the start position of each of the frames is different from the number of main data frames from the first frame to the start position of the same frame.

The fast-forward replay operation and the rewind and replay operation performed by the replay apparatus 1 of FIG. 1 will now be discussed with reference to FIG. 4.

The fast-forward replay operation and rewind and replay operation are performed on a per frame basis. When a user commands the apparatus 1 to replay a frame, N frames behind a frame #3, during the replay operation of the frame #3 as shown in FIG. 4, the decoder 13 of the replay apparatus 1 jumps to a frame #(N+3) from the frame #3 and replays the frame #(N+3). Here, N is a positive or negative integer. If N is a positive integer, the music is fast-forwarded. If N is a negative integer, the music is rewound and replayed.

To display total play time on a display (not shown) during the fast-forward replay operation or the rewind and replay operation of the music, the replay apparatus 1 must calculate the play time from the first frame #1 and the start position of the frame #(N+3) to which the replay apparatus 1 has jumped.

As already shown in FIG. 2, the number of main data frames from the first frame to the start position of each subsequent frame equals the number of frames from the first frame to the start position of the same frame in the audio elementary stream having the fixed-length coded data. When one of the fast-forward replay operation and the rewind and replay operation is performed, the replay apparatus 1 detects the exact number of main data frames contained between the first frame #1 and the frame #(N+3) as a jump target.

More specifically, the replay apparatus 1 numbers, in succession, the frames from the first frame to subsequent frames and then detects the frame number #(N+3) as the jump target, thereby detecting (N+2) as the number of main data frames contained in the first frame #1 to the frame #(N+3) as the jump target. Based on the number of main data frames (N+2) and the sampling frequency described in the frame header, the replay apparatus 1 calculates total play time from the first frame #1 to the frame #(N+3) as the jump target.

However, in an audio elementary stream formed of variable-length coded data, the number of main data frames from the first frame to the start position of each of the frames is not necessarily equal to the number of frames from the first frame to the start position of the same frame. The replay apparatus 1 has difficulty in detecting the exact number of main data frames contained in the first frame #1 to the frame #(N+3) as the jump target during the fast-forward replay operation or the rewind and replay operation. As a result, no exact total play time is calculated. Each time the fast-forward replay operation or the rewind and replay operation is performed, the displayed total play time varies in time.

It is particularly difficult for the replay apparatus 1 to calculate the total play time on the order of the audio access unit, namely, on the order of tens of milliseconds.

SUMMARY OF THE INVENTION

Accordingly, it is an object of the present invention to provide a replay apparatus that calculates exact total play time in a fast-forward replay operation or a rewind and replay operation.

A replay apparatus in accordance with a first aspect of the present invention for replaying an elementary stream having a plurality of fixed-length frames containing data expressed in variable-length frames includes a total frame size calculating unit operable to calculate a total frame size from a first fixed-length frame to a start point of each of the fixed-length frames based on information contained in a header of the fixed-length frame, a frame start address calculating unit operable to calculate a start address of the variable-length frames with respect to the fixed-length frame based on the total frame size, a variable-length frame total count calculating unit operable to calculate a total count of the variable-length frames contained in the first fixed-length frame to a selected fixed-length frame based on the total frame size and the start address of the variable-length frames, and a play time calculating unit operable to calculate a play time from the first fixed-length frame down to a fixed-length frame to be replayed based on the total count of the variable-length frames calculated by the variable-length frame total count calculating unit.

The replay apparatus preferably further includes a decoder operable to decode the elementary stream on a per audio access unit basis, wherein the play time calculating unit adds to the play time each time the decoder decodes the elementary stream.

A method in accordance with a second aspect of the present invention for replaying an elementary stream having a plurality of fixed-length frames containing data expressed in variable-length frames includes calculating a total frame size from a first fixed-length frame to a start point of each of the fixed-length frames based on information contained in a header of the fixed-length frame, calculating a start address of the variable-length frames with respect to the fixed-length frame based on the total frame size, calculating a total count of the variable-length frames contained in the first fixed-length frame to a selected fixed-length frame based on the total frame size and the start address of the variable-length frames, and calculating a play time from the first fixed-length frame down to a fixed-length frame to be replayed based on the calculated total count of the variable-length frames.

A recording medium recorded with a computer program in accordance with a third aspect of the present invention causes a computer to perform a process for replaying an elementary stream having a plurality of fixed-length frames containing data expressed in variable-length frames. The process includes calculating a total frame size from a first fixed-length frame to a start point of each of the fixed-length frames based on information contained in a header of the fixed-length frame, calculating a start address of the variable-length frames with respect to the fixed-length frame based on the total frame size, calculating a total count of the variable-length frames contained in the first fixed-length frame to a selected fixed-length frame based on the total frame size and the start address of the variable-length frames, and calculating a play time from the first fixed-length frame to a fixed-length frame to be replayed based on the calculated total count of the variable-length frames.

A system in accordance with a fourth aspect of the present invention replays an elementary stream having a plurality of fixed-length frames containing data expressed in variable-length frames. The system includes a processor operable to execute instructions, and instructions including calculating a total frame size from a first fixed-length frame to a start point of each of the fixed-length frames based on information contained in a header of the fixed-length frame, calculating a start address of the variable-length frames with respect to the fixed-length frame based on the total frame size, calculating a total count of the variable-length frames contained in the first fixed-length frame to a selected fixed-length frame based on the total frame size and the start address of the variable-length frames, and calculating a play time from the first fixed-length frame to a fixed-length frame to be replayed based on the calculated total count of the variable-length frames.

BRIEF DESCRIPTION OF THE DRAWINGS

FIG. 9 illustrates a syntax through which the number of main data frames is determined;

DETAILED DESCRIPTION

A replay apparatus (a replay apparatus 130 of FIG. 5, for example) of the present invention for replaying an elementary stream having a plurality of fixed-length frames containing data expressed in a variable-length frame, includes a total frame size calculating unit (for example, a demultiplexer 131 for calculating equation (1) below) for calculating the total frame size from a first fixed-length frame to the start point of each of the fixed-length frames based on information contained in a header of the fixed-length frame, a frame start address calculating unit (for example, the demultiplexer 131 for calculating equation (2) below) for calculating the start address of the variable-length frame with respect to the fixed-length frame based on the total frame size, a variable-length frame total count calculating unit (for example, the demultiplexer 131 for performing calculations based on a syntax illustrated in FIG. 9) for calculating the total count of variable-length frames contained in the first fixed-length frame to a specified fixed-length frame based on the total frame size and the start address of the variable-length frames, and a play time calculating unit (for example, a decoder 134 for performing the process in step S8 of FIG. 10) for calculating the play time from the first fixed-length frame to a fixed-length frame to be replayed, based on the total count of variable-length frames calculated by the variable-length frame total count calculating unit.

Figure 10:
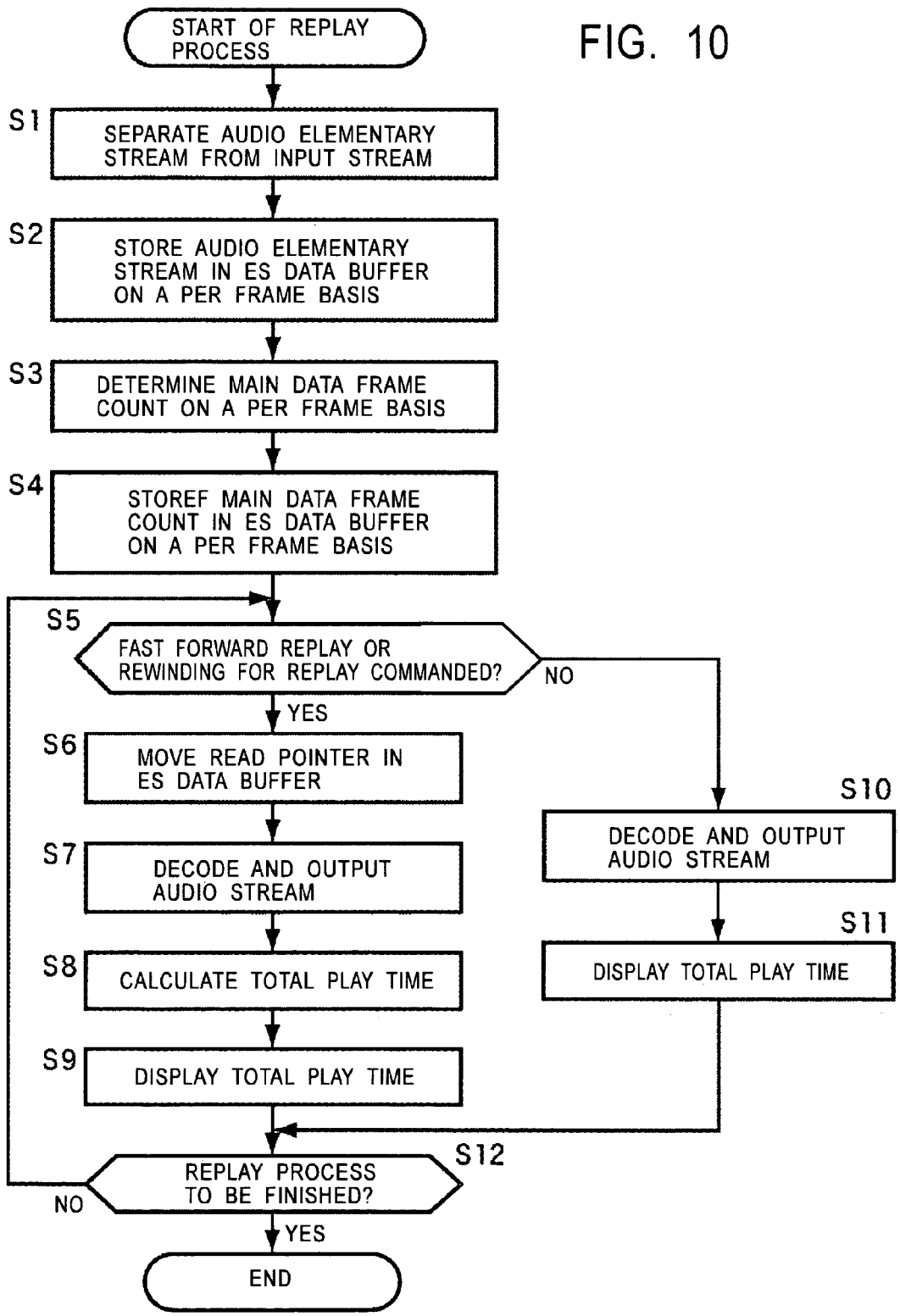
FIG. 10 is a flowchart illustrating a replay process of the replay apparatus of FIG. 1.

The replay apparatus preferably further includes a decoder (for example, a decoder 134 in FIG. 5) for decoding the elementary stream on a per audio access unit basis, wherein the play time calculating unit adds to the play time each time the decoder decodes the elementary stream (for example, in the process in step S11 of FIG. 10).

A replay method of the present invention for replaying an elementary stream having a plurality of fixed-length frames containing data expressed in a variable-length frame, includes a total frame size calculating step (for example, step S3 of FIG. 10 for calculating equation (1)) for calculating the total frame size from a first fixed-length frame to the start point of each of the fixed-length frames based on information contained in a header of the fixed-length frame, a frame start address calculating step (for example, step S3 of FIG. 10 for calculating equation (2)) for calculating the start address of the variable-length frame with respect to the fixed-length frame based on the total frame size, a variable-length frame total count calculating step (for example, step S3 for calculating the syntax of FIG. 9) for calculating the total count of variable-length frames contained in the first fixed-length frame to a specified fixed-length frame based on the total frame size and the start address of the variable-length frame, and a play time calculating step (for example, step S8 of FIG. 9) for calculating the play time from the first fixed-length frame to a fixed-length frame to be replayed, based on the total count of variable-length frames calculated in the variable-length frame total count calculating step.

The preferred embodiments of the present invention will now be discussed.

Figure 1:
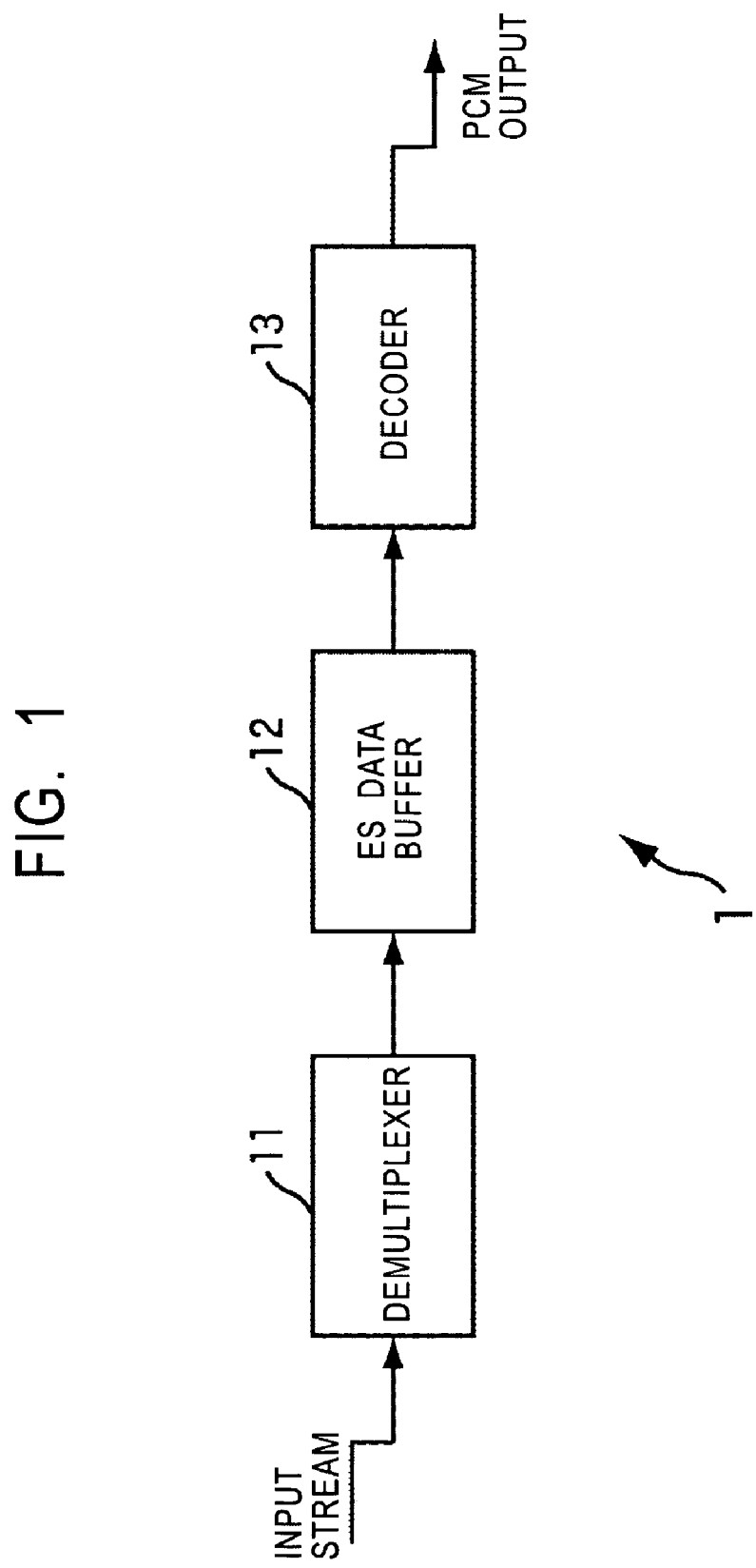
FIG. 1 is a block diagram of the structure of a known replay apparatus.
Figure 2:
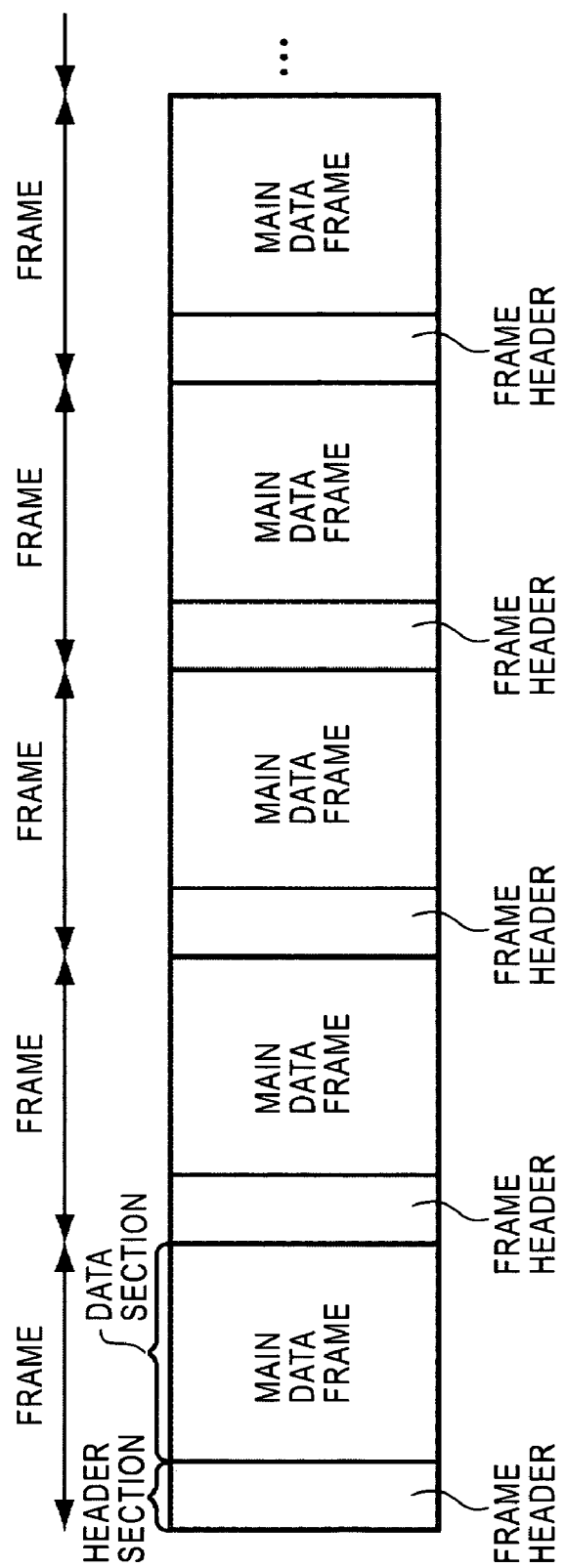
FIG. 2 illustrates an audio elementary stream (ES) formed of fixed-length coded data.
Figure 3:
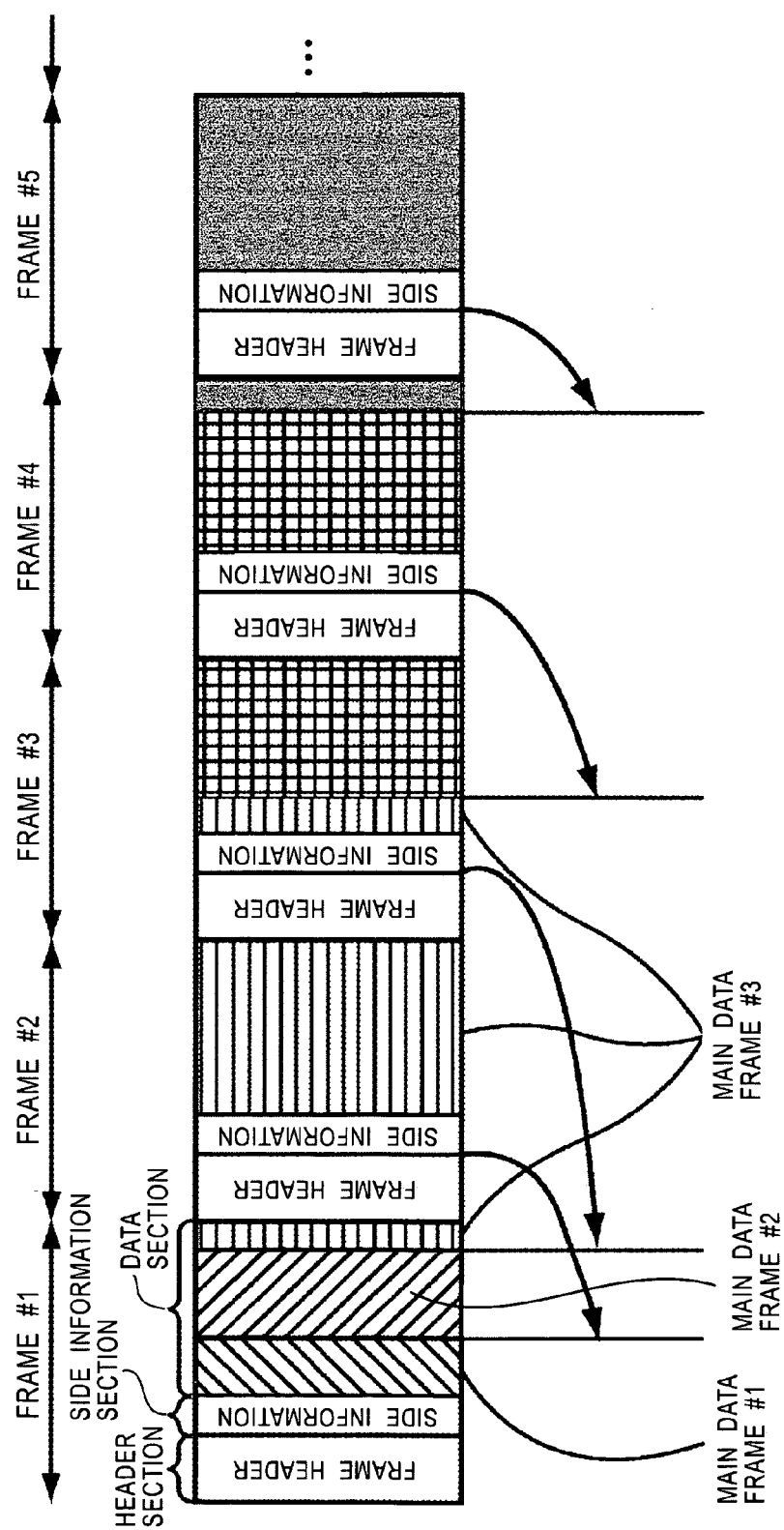
FIG. 3 illustrates an audio elementary stream formed of variable-length coded data.
Figure 4:
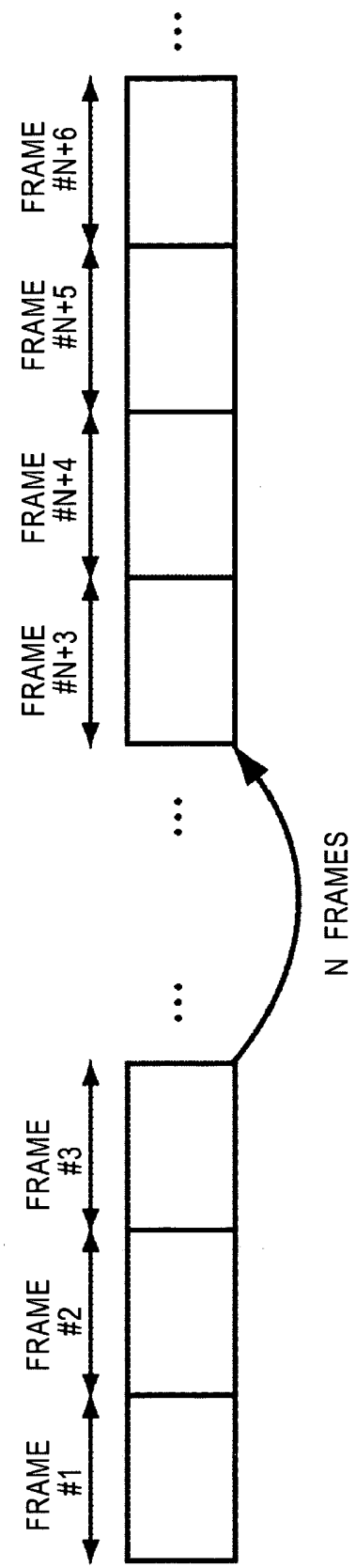
FIG. 4 illustrates a fast-forward replay operation and a rewind and replay operation.
Figure 5:
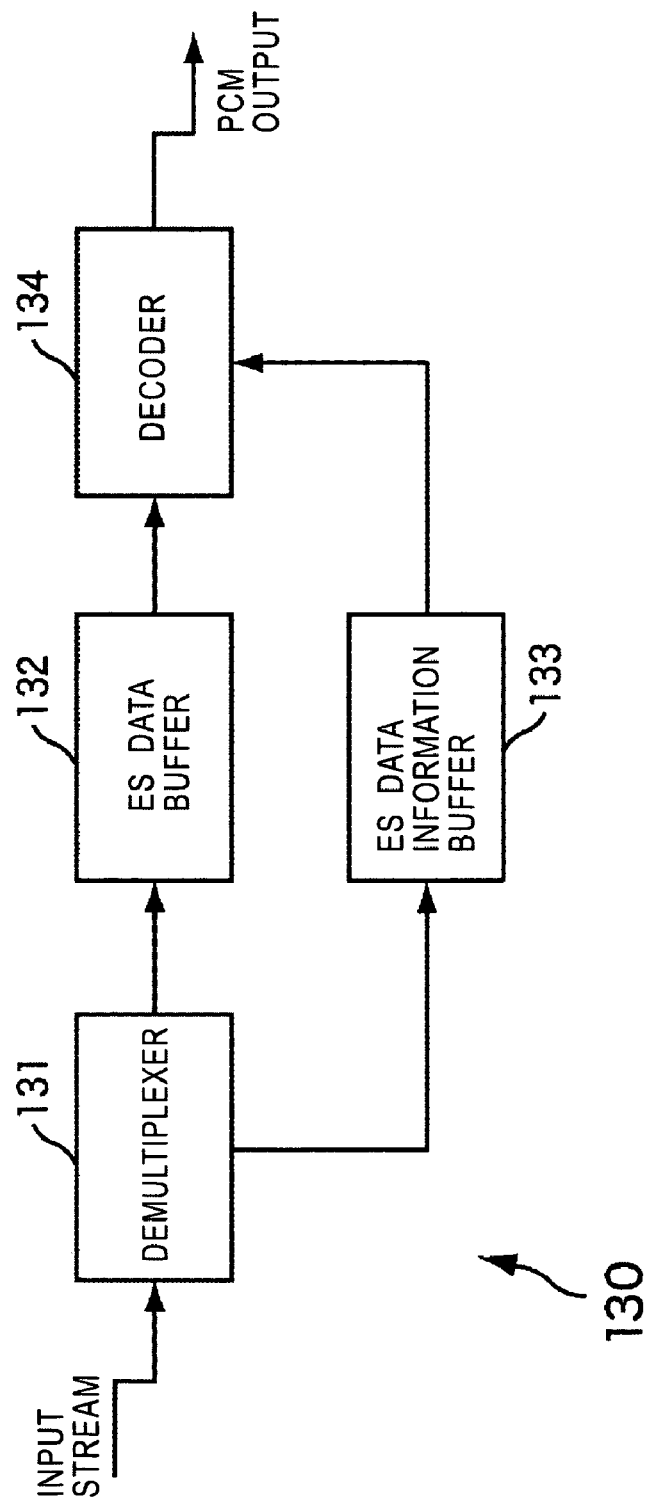
FIG. 5 illustrates the structure of a replay apparatus in accordance with one preferred embodiment of the present invention.

FIG. 5 is a block diagram illustrating a replay apparatus 130 of one preferred embodiment of the present invention. The replay apparatus 130 includes a demultiplexer 131, an ES data buffer 132, an ES data information buffer 133, and a decoder 134.

The replay apparatus 130 receives, as an input stream, an elementary stream into which audio elementary streams are multiplexed, and then feeds the input stream to the demultiplexer 131. The audio elementary stream is constructed of data that is obtained by variable-length coding PCM music data.

The demultiplexer 131 demultiplexes the multiplexed audio elementary stream into the audio elementary stream, and then stores the ES data in the ES data buffer 132 which is a data buffer area for each frame.

The demultiplexer 131 counts the number of frames, calculates, for each frame, the number of main data frames contained in a first frame to that frame based on the frame count, frame header, and side information, and stores the main data frame count in the ES data information buffer 133.

The decoder 134 acquires, from the ES data buffer 132, the ES data of the audio elementary stream that has been stored on a frame by frame basis, decodes the ES data on a per audio access unit basis, and outputs (replays) the resulting PCM data.

The decoder 134 acquires, from the ES data information buffer 133, the main data frame count contained in the first frame down to each subsequent frame while acquiring, from the ES data buffer 132, a sampling frequency and a sample count described in a frame header. Based on the main data frame count, the sampling frequency, and the sample count, the decoder 134 calculates the total play time from the first frame to a frame to be replayed, namely, a frame corresponding to a position of music a user has commanded the replay apparatus to replay by operating an operation unit (not shown) The decoder 134 then displays the total play time on a display (not shown).

Figure 6:
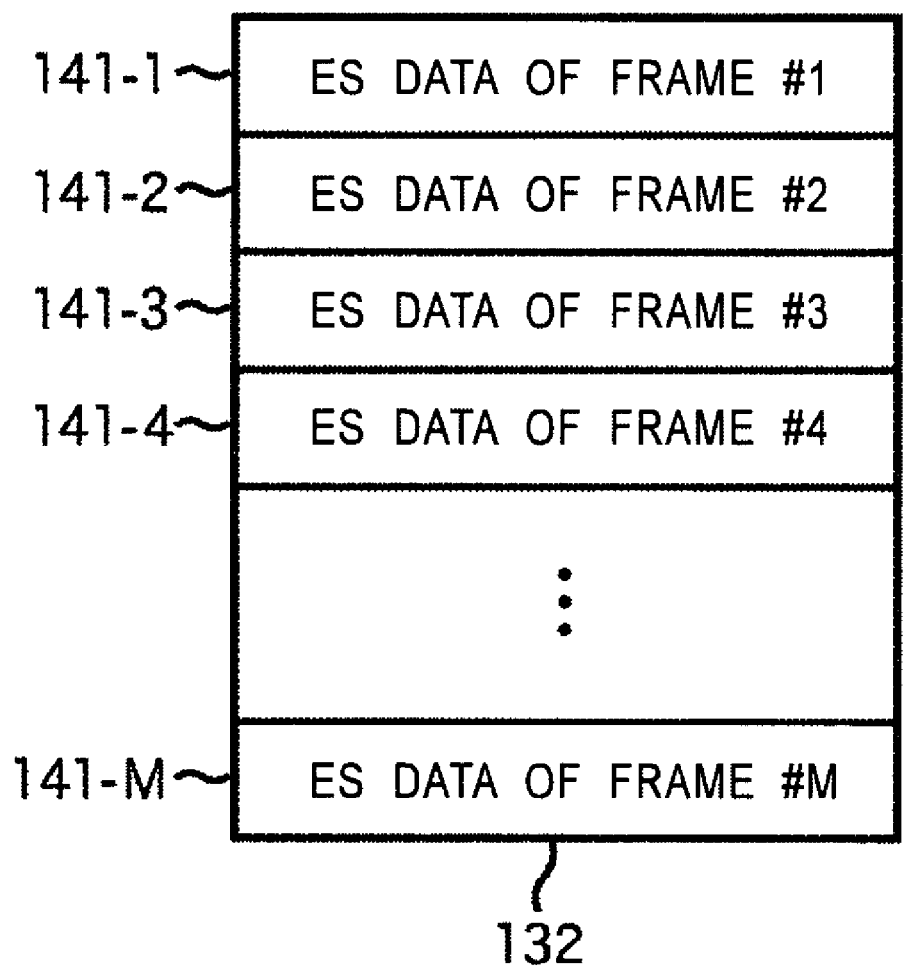
FIG. 6 illustrates the structure of an ES data buffer of FIG. 1.
Figure 7:
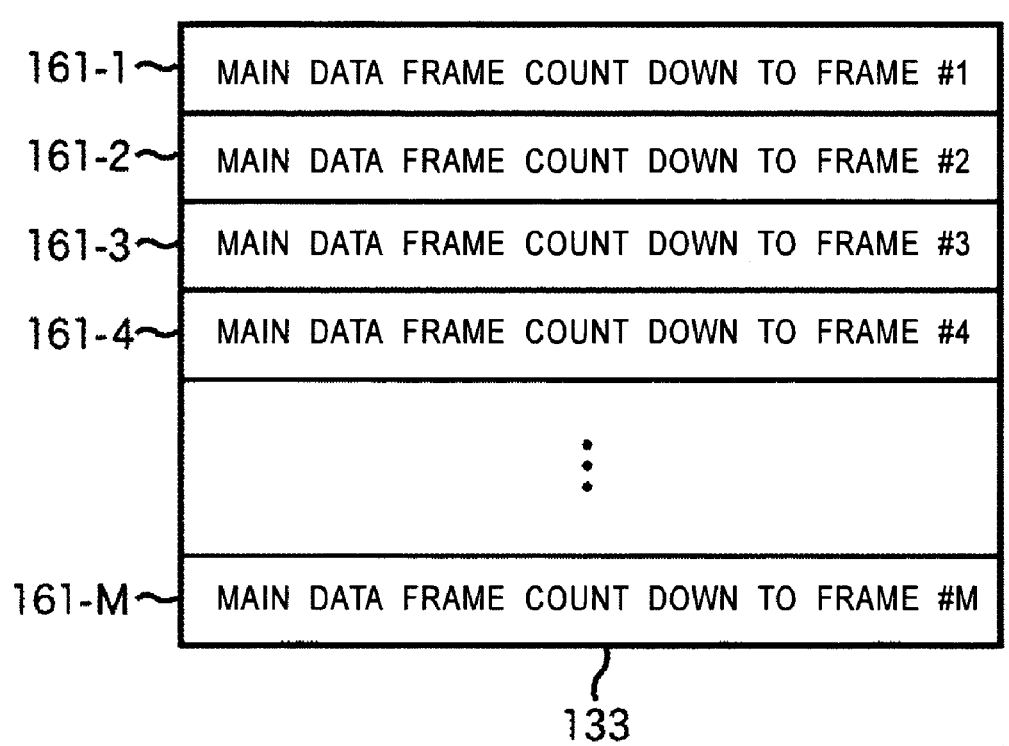
FIG. 7 illustrates the structure of an ES data information buffer of FIG. 1.

FIG. 6 illustrates the structure of the ES data buffer 132 of FIG. 5, and FIG. 7 illustrates the structure of the ES data information buffer 133.

In the examples shown in FIGS. 6 and 7, the first frame and subsequent frames of the audio elementary stream are successively numbered with 1 through M.

The frame numbered with number "i" is referred to as frame #i. As shown in FIG. 6, the ES data buffer 132 stores ES data of a frame #1 in an area 141-1, ES data of a frame #2 in an area 141-2, ES data of a frame #3 in an area 141-3, ES data of a frame #4 in an area 141-4, . . . , and ES data of a frame #M in an area 141-M, respectively.

Referring to FIG. 7, the ES data information buffer 133 stores a main data frame count of the frame #1 in an area 161-1, a main data frame count all the way down to the frame #2 in an area 161-2, a main data frame count all the way down to the frame #3 in an area 161-3, a main data frame count all the way down to the frame #4 in an area 161-4, . . . , and a main data frame count all the way down to the frame #M in an area 161-M, respectively.

The demultiplexer 131 calculates the main data frame count from the first frame to each subsequent frame. The calculation operation of the demultiplexer 131 is discussed with reference to FIGS. 8 and 9.

Figure 8:
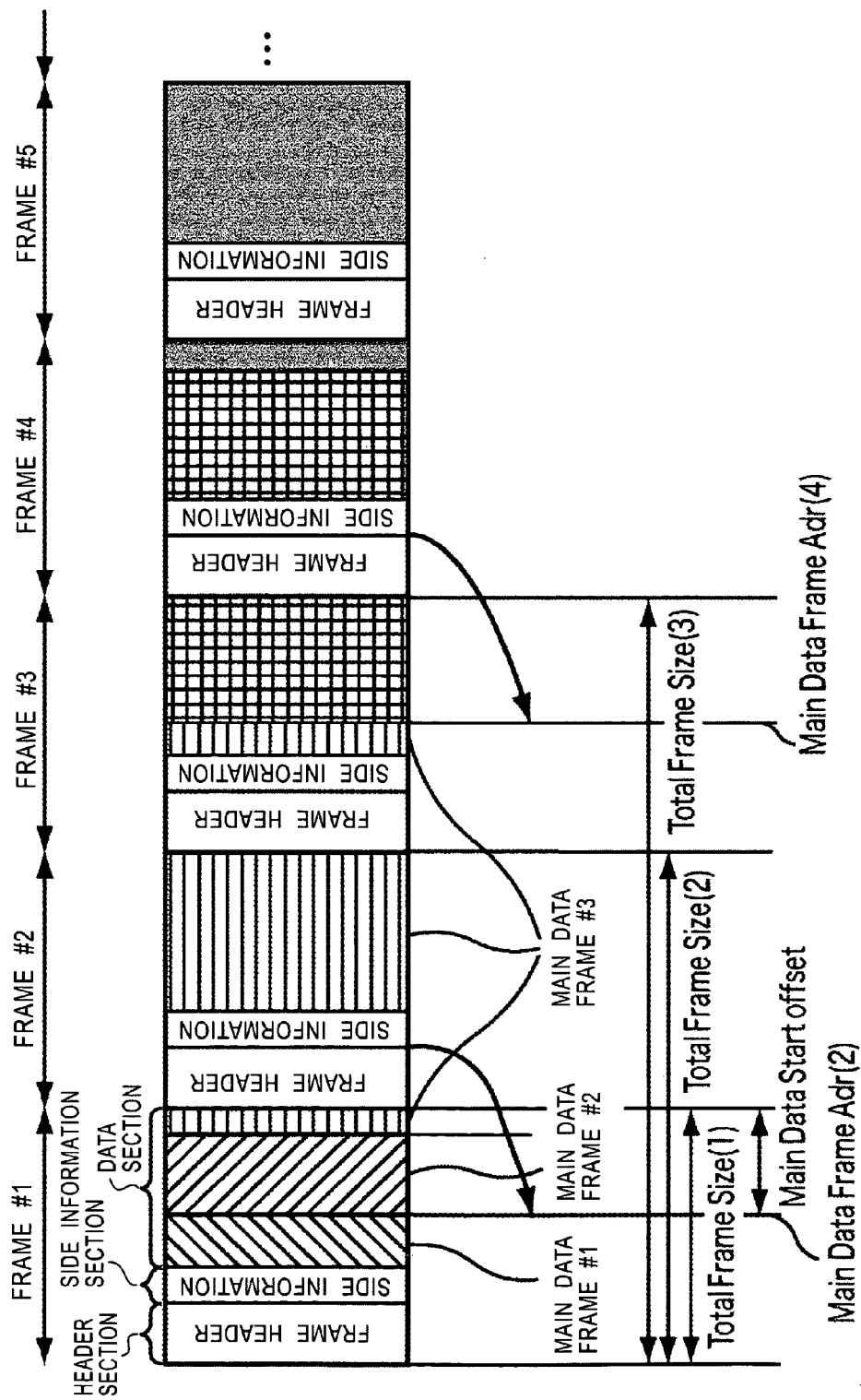
FIG. 8 illustrates an audio elementary stream constructed of variable-length coded data.

FIG. 8 illustrates an audio elementary stream constructed of variable-coded data separated by the demultiplexer 131. The audio elementary stream constructed of the variable-coded data contains a plurality of fixed-length frames. Each frame includes a header section, a side information section, and a data section.

The header section includes a frame header. The frame header, having a constant period of time, starts with a synchronization bit. Written on the frame header are a sample count SampleCnt of the main data frames, a sampling frequency SamplingFreq and a bit rate BitRate used to encode the data of the data section, and a padding flag PaddingFlag that is information as to the presence or absence of a padding representing data used to align a frame size with a byte unit.

Written in the side information section is side information indicating a start position of the main data frame with respect to each frame. For example, the side information of the frame #2 holds, as the start position of the main data frame #2, an offset value MainDataStartoffset from an address of a start position of the frame #2 to an address of a start position of the main data frame #2.

The data section contains a main data frame representing data (variable-coded data) that is obtained by variable-coding the PCM data of one audio access unit with respect to each frame. For example, the data that is obtained by variable-length coding the PCM data for the frame #1 is the main data frame #1, and the data that is obtained by variable-length coding the PCM data for the frame #2 is the main data frame #2. The data that is obtained by variable-length coding the PCM data for the frame #3 is the main data frame #3.

If a main data frame for the frame #N is currently of interest, the demultiplexer 131 determines a total frame size TotalFrameSize (N−1) from the first frame (frame #1) down to the start position of the frame #N (the end position of the frame #(N−1)), based on the frame header and the frame number of the frame #N of the audio elementary stream separated from the input stream.

The frame size remains the same regardless of whether the main data frame is variable-length coded data or fixed-length coded data. It is assumed that the main data frame is fixed-length coded data. The main data frame count from the first frame (frame #1) to the start position of the frame #N is frame count (N−1), and total frame size TotalFrameSize (N−1) is (N−1) times one main data frame size. The following equation (1) holds.

$$\text{TotalFrameSize } (N-1)|_{byte} = \{\text{SampleCnt} \times \text{BitRate}/\text{SamplingFreq}/8 + \text{PaddingFlag}\} \times (N-1) \quad (1)$$

From equation (1), the one main data frame size is determined from the sample count SampleCnt of the main data frames described in the frame header, the sampling frequency SamplingFreq and the bit rate BitRate used in an encoding operation, and the padding flag PaddingFlag that is information as to the presence or absence of a padding representing data used to align the frame size in byte units. In other words, the byte number is determined from the sample count SampleCnt of the main data frames, the sampling frequency SamplingFreq, and the bit rate BitRate. If the byte number is not an integer, any fractional part thereof is rounded off. The frame size is aligned with a byte unit by adding the padding flag PaddingFlag to the rounded byte number.

For example, if the sample number SampleCnt is 1152, the bit rate BitRate is 128 kbps, and the sampling frequency SamplingFreq is 44.1 kHz, the byte number of the main data frames is SampleCnt×BitRate/SamplingFreq/8=417.95 bytes. Since the bit number of the main data frame is not a multiple of 8, a padding is attached to the main data frame to align the frame size with a byte unit. The padding flag PaddingFlag described in the frame header is set, namely, 1. The byte number of the main data frame becomes 417 bytes with the fraction part thereof rounded down. With the padding flag PaddingFlag 1 added thereto, the main data frame becomes 418 bytes. The sum of the bit number of the main data frame and the bit number of the padding attached to the main data frame become an exact frame size.

The demultiplexer 131 determines a front address MainDataFrameAdr(N) of the main data frame of the frame #N from the total frame size TotalFrameSize(N−1) determined by equation (1). The following equation (2) expresses the front address MainDataFrameAdr(N) of the main data frame, based on an offset value MainDataStartoffset from the start position of the main data frame represented by the side information of the frame #N, namely, an address of the start position of the frame #N, to an address of the start position of the main data frame #N.

$$\text{MainDataFrameAdr } (N)|_{byte} = \text{TotalFrameSize } (N-1) - \text{MainDataStartoffset} \quad (2)$$

As shown in FIG. 8, a front address MainDataFrameAdr (2) of the main data frame of the frame #2 is obtained by subtracting an offset value MainDataStartoffset from an address of the start position of the frame #2 represented by the side information of the frame #2 to an address of the start position of the main data frame #2, from the total frame size TotalFrameSize(1).

The demultiplexer 131 determines the main data frame count MainDataFrameCnt between the first frame and each subsequent frame, based on the front address MainDataFrameAdr(N) of the main data frame determined in equation (2).

Referring to FIG. 9, a number X of a frame #X, in which a front address MainDataFrameAdr(N) of the main data frame of equation (2) is present, is expressed as X=cnt (1≦cnt≦N) if MainDataFrameAdr(N) is equal to or larger than the total frame size TotalFrameSize(cnt−1) determined by equation (1) and smaller than total frame size TotalFrameSize(cnt). It is thus found that the front address MainDataFrameAdr(N) of the main data frame with respect to the frame #N is present in the frame #X. By determining a frame having the main data frame with respect to each of the frame #1, . . . , frame #M, the main data frame count contained to each of the frames is thus calculated.

For example, as shown in FIG. 8, the main data frame address MainDataFrameAdr(4) with respect to the frame #4 is equal to or larger than the total frame size TotalFrameSize (2) from the first frame #1 to the start position of the frame #2, and smaller than the total frame size TotalFrameSize(3) from the first frame #1 to the frame #3. Therefore, a frame in which the main data frame address MainDataFrameAdr (4) with respect to the frame #4 is found to be the frame #3. The main data frame count MainDataFrameCnt(3) contained in the first frame down to the frame #3 is three, namely, the main data frame #1, the main data frame #2, and the main data frame #3.

FIG. 10 is a flowchart illustrating the replay process of the replay apparatus 130 of FIG. 5. The replay process starts when a user commands the apparatus to replay music by operating the operation unit (not shown) and an input stream is input to the replay apparatus 130.

In step S1, the demultiplexer 131 separates a multiplexed input stream into an audio elementary stream.

In step S2, the demultiplexer 131 stores the ES data of the audio elementary stream, separated in step S1, in the ES data buffer 132 on a frame by frame basis. The demultiplexer 131 counts the number of frames of the separated audio elementary stream, and numbers each of the frames starting with 1 for the first frame. As shown in FIG. 6, the demultiplexer 131 stores, as the ES data of a frame #i in the ES data buffer 132, the ES data of the audio elementary stream of the frame numbered with "i" on a frame by frame basis.

In step S3, subsequent to step S2, the demultiplexer 131 determines the main data frame count MainDataFrameCnt contained in the first frame to each of the subsequent frames on a frame by frame basis.

More specifically, the demultiplexer 131 calculates the total frame size TotalFrameSize from the first frame to each of the subsequent frames on a frame by frame basis in accordance with the above-mentioned equation (1). The demultiplexer 131 determines the front address Main- DataFrameAdr of the main data frame of each frame based on the calculated TotalFrameSize and the offset value MainDataStartoffset represented by the side information of the frame. The demultiplexer 131 determines a frame in which a main data frame corresponding to each of the frames is present, based on the syntax illustrated in FIG. 9, and then determines the main data frame count MainDataFrameCnt from the first frame to each of the frames.

In step S4, the demultiplexer 131 stores the main data frame count MainDataFrameCnt determined in step S3 in the ES data information buffer 133 on a frame by frame basis as shown in FIG. 7.

In step S5, the decoder 134 determines whether the user has issued an instruction for a fast-forward replay operation or a rewind and replay operation through the operation unit (not shown). If it is determined that an instruction for a fast-forward replay operation or a rewind and replay operation has been issued, the algorithm proceeds from step S5 to step S6.

In step S6, the decoder 134 moves a read pointer representing in the ES data buffer 132 a position of data to be read by the decoder 134 in response to the instruction for a fast-forward replay operation or a rewind and replay operation. The algorithm then proceeds to step S7. If the user has issued an instruction for a fast-forward replay operation for forwarding to the frame #4 during the replay of the frame #2, the decoder 134 moves the read pointer from the frame #2 to the frame #4.

In step S7, the decoder 134 acquires and decodes the one audition access unit of the audio elementary stream, namely, data of one main data frame from the ES data buffer 132 in accordance with the read pointer moved in step S6. The resulting PCM data is then output. The decoder 134 moves the read pointer of the ES data buffer 132 to the next data frame.

The algorithm then proceeds to step S8. The decoder 134 calculates total play time. More specifically, the decoder 134 acquires the main data frame count MainDataFrameCnt, contained to a frame immediately prior to a frame indicated by the user, and stored in the ES data information buffer 133. The decoder 134 also acquires the sampling frequency SamplingFreq and the sample count SampleCnt described in the frame header, from the ES data of the audio elementary stream stored in the ES data buffer 132. Using the following equation (3), the decoder 134 calculates the total play time TotalPlayTime from the first frame to the frame which is a target of the fast-forward replay operation or the rewind and replay operation, based on the main data frame count MainDataFrameCnt, the sampling frequency SamplingFreq, and the sample count SampleCnt.

$$TotalPlayTime = SampleCnt \times MainDataFrameCnt / SamplingFreq \quad (3)$$

In accordance with equation (3), the sample count from the first frame to the fast-forward target frame or the rewind and replay target frame is determined from the sample count SampleCnt of the main data frames and the main data frame count MainDataFrameCnt. The total play time TotalPlayTime is determined from the sample count and the sampling frequency SamplingFreq.

For example, if an instruction for a fast-forward replay operation for forwarding to the frame #4 is issued during the replay of the frame #2, the decoder 134 acquires the main frame data count MainDataFrameCnt to the frame #3 immediately prior to the frame #4 from the area 161-3 of the ES data information buffer 133. The decoder 134 also acquires the sampling frequency SamplingFreq described in the frame header of the ES data of the frame #3 and the sample count SampleCnt from the area 141-3 of the ES data buffer 132. The decoder 134 thus calculates the total play time TotalPlayTime from the main data frame count MainDataFrameCnt, the sampling frequency SamplingFreq, and the sampling count SampleCnt.

The exact main data frame count contained in the first frame to each subsequent frame is determined with respect to each frame in step S3. Based on the main data frame count, the decoder 134 calculates the exact total play time on the order of the main data frame unit, namely, on the order of an audio access unit of tens of milliseconds.

In step S9, the decoder 134 displays the total play time, calculated in step S8, on the display (not shown).

If the decoder 134 determines in step S5 that the user has not issued an instruction for a fast-forward replay operation or a rewind and replay operation, the algorithm proceeds to step S10. In accordance with the read pointer of the ES data buffer 132, the decoder 134 acquires and decodes one audio access unit of the audio elementary stream, namely, data of one main data frame, and outputs the resulting PCM data. The decoder 134 moves the read pointer of the ES data buffer 132 to the next main data frame.

In step S11, the decoder 134 displays the total play time on the display (not shown). The decoder 134 adds, to the preceding total play time, time corresponding to the one audio access unit, to determine a new total play time. The new total play time is displayed on the display (not shown).

Subsequent to the process in step S9 or in step S11, the algorithm proceeds to step S12. The decoder 134 determines whether the user has issued an instruction for ending the replay on the operation unit (not shown). If the decoder 134 determines that the user has not issued an instruction for ending the replay, the algorithm loops to step S5 to repeat the above-referenced process.

If the decoder 134 determines in step S12 that the user has issued an instruction for ending the replay, the process ends.

In the above discussion, the replay apparatus 130 replays an audio elementary stream constructed of variable-length coded data. Alternatively, the replay apparatus 130 may replay an audio elementary stream constructed of fixed-length coded data. Furthermore, the replay apparatus 130 may replay an audio elementary stream constructed of both variable-length data coded according to MPEG 1 Layer 3 (MP3), for example, and fixed-length coded data. In the same manner as previously discussed, the total play time is calculated on the order of the audio access unit.

The replay apparatus 130 may receive, as the input stream, data coded in accordance with MPEG 1 Layer 3 (MP3).

The replay apparatus 1 may be an audio visual apparatus or a dedicated audio apparatus.

The above series of process steps may be performed using hardware or software. A personal computer illustrated in FIG. 11 performs the process steps.

Figure 11:
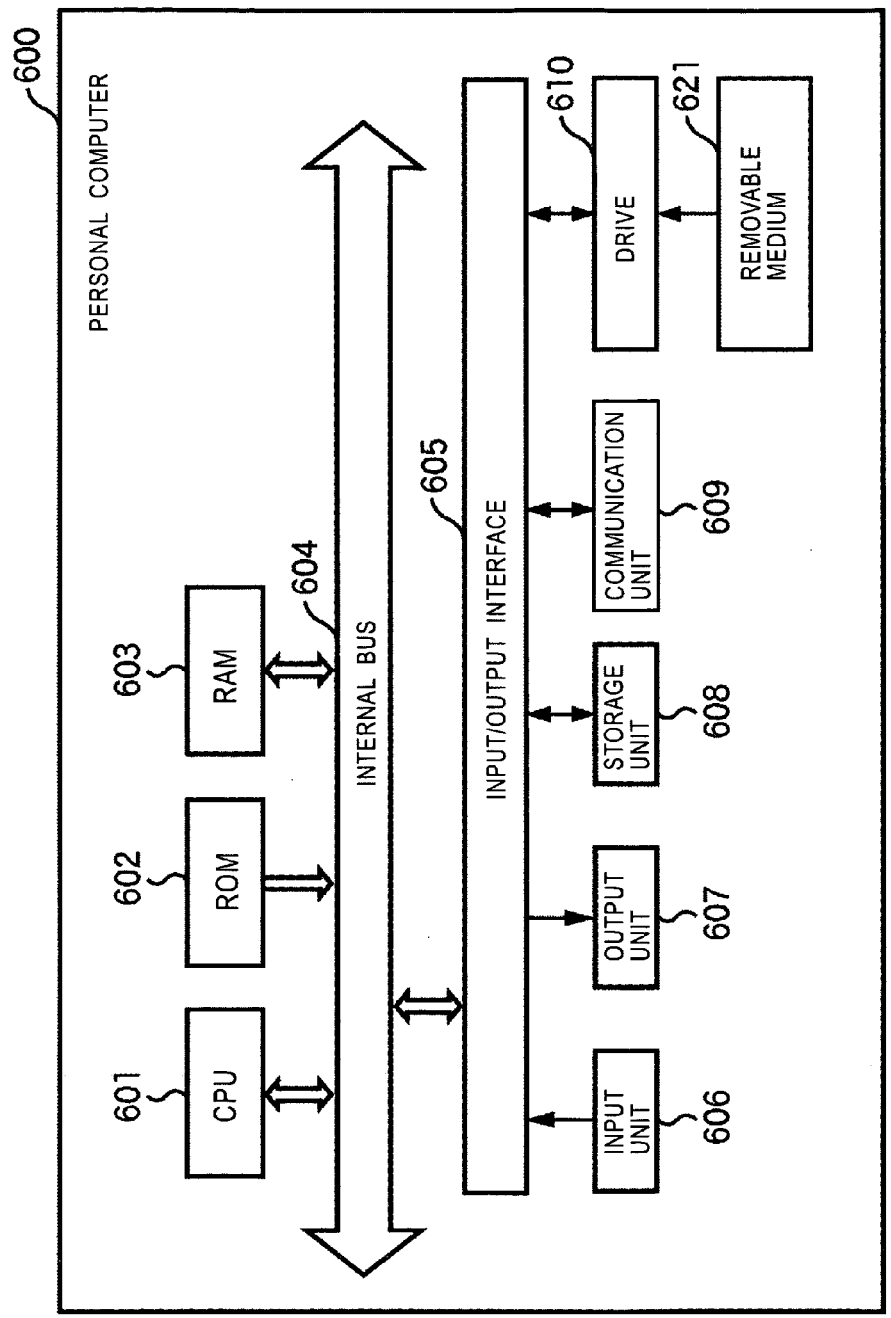
FIG. 11 is a block diagram illustrating the structure of a personal computer.

Referring to FIG. 11, a central processing unit (CPU) 601 performs a variety of processes in accordance with the program stored in a read-only memory (ROM) 602, or the program loaded from a storage unit 608 to a random-access memory (RAM) 603. The RAM 603 stores data the CPU 601 needs to perform various processes.

The CPU 601, the RAM 602, and the RAM 603 are interconnected through an internal bus 604. The internal bus 604 is connected to an input/output interface 605.

Also connected to the input/output interface 605 are an input unit 606 including a keyboard, a mouse, etc., an output unit 607 including a display such as a cathode-ray tube (CRT) or a liquid-crystal display (LCD), and a loudspeaker, the storage unit 608 including a hard disk, and a communication unit 609 including a modem, a terminal adapter, etc. The communication unit 609 performs a communication process through a variety of networks including a telephone line and CATV.

Also connected to the input/output interface 605 is a drive 610 as necessary. A removable medium 621, such as a magnetic disk, an optical disk, a magneto-optical disk or a semiconductor memory, is loaded onto the drive 610, as necessary. A computer program read from one of such media is installed in the storage unit 608 as necessary.

If the series of process steps is performed using software, a computer program of the software may be installed from a network or a recording medium to a memory of a computer assembled into dedicated hardware, or into a general-purpose computer that performs a variety of functions by installing various programs thereon.

As shown in FIG. 11, the recording medium may be not only a package medium such as the removable medium 621 storing the program and supplied separately from the computer to a user to provide the program, but also the ROM 602 and a hard disk such as the storage unit 608, each storing the program.

The process steps discussed in this specification are sequentially performed in time series order as stated. Alternatively, the steps may be performed in parallel or separately.

The present invention thus calculates the total play time. During the fast-forward replay operation or the rewind and replay operation, the exact play time is calculated.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A replay apparatus for replaying an elementary stream having a plurality of fixed-length frames containing data expressed in variable-length frames, the replay apparatus comprising:
   a total frame size calculating unit operable to calculate a total frame size from a first fixed-length frame to a start point of each of the fixed-length frames based on information contained in a header of the fixed-length frame;
   a frame start address calculating unit operable to calculate a start address of the variable-length frames with respect to the fixed-length frame based on the total frame size;
   a variable-length frame total count calculating unit operable to calculate a total count of the variable-length frames contained in the first fixed-length frame to a selected fixed-length frame based on the total frame size and the start address of the variable-length frames; and
   a play time calculating unit operable to calculate a play time from the first fixed-length frame to a fixed-length frame to be replayed based on the total count of the variable-length frames calculated by the variable-length frame total count calculating unit.

2. A replay apparatus according to claim 1, further comprising a decoder operable to decode the elementary stream on a per audio access unit basis, wherein the play time calculating unit adds to the play time each time the decoder decodes the elementary stream.

3. A method for replaying an elementary stream having a plurality of fixed-length frames containing data expressed in variable-length frames, the replay method comprising:
   calculating a total frame size from a first fixed-length frame to a start point of each of the fixed-length frames based on information contained in a header of the fixed-length frame;
   calculating a start address of the variable-length frames with respect to the fixed-length frame based on the total frame size;
   calculating a total count of the variable-length frames contained in the first fixed-length frame to a selected fixed-length frame based on the total frame size and the start address of the variable-length frames; and
   calculating a play time from the first fixed-length frame to a fixed-length frame to be replayed based on the calculated total count of the variable-length frames.

4. A recording medium recorded with a computer program for causing a computer to perform a process for replaying an elementary stream having a plurality of fixed-length frames containing data expressed in variable-length frames, the process comprising:
   calculating a total frame size from a first fixed-length frame to a start point of each of the fixed-length frames based on information contained in a header of the fixed-length frame;
   calculating a start address of the variable-length frames with respect to the fixed-length frame based on the total frame size;
   calculating a total count of the variable-length frames contained in the first fixed-length frame to a selected fixed-length frame based on the total frame size and the start address of the variable-length frames; and
   calculating a play time from the first fixed-length frame to a fixed-length frame to be replayed based on the calculated total count of the variable-length frames.

5. A system for replaying an elementary stream having a plurality of fixed-length frames containing data expressed in variable-length frames, the system comprising:
   a processor operable to execute instructions; and
   instructions, the instructions including:
   calculating a total frame size from a first fixed-length frame to a start point of each of the fixed-length frames based on information contained in a header of the fixed-length frame;
   calculating a start address of the variable-length frames with respect to the fixed-length frame based on the total frame size;
   calculating a total count of the variable-length frames contained in the first fixed-length frame to a selected fixed-length frame based on the total frame size and the start address of the variable-length frames; and
   calculating a play time from the first fixed-length frame to a fixed-length frame to be replayed based on the calculated total count of the variable-length frames.

* * * * *